(12) United States Patent
Gaustad et al.

(10) Patent No.: US 8,552,129 B2
(45) Date of Patent: *Oct. 8, 2013

(54) LOW MELT FLOW BRANCHED IONOMERS

(75) Inventors: John Gaustad, Friendswood, TX (US);
Juan J. Aguirre, League City, TX (US);
Joe Shuler, League City, TX (US)

(73) Assignee: Fina Technology, Inc., Houston, TX (US)

( * ) Notice: Subject to any disclaimer, the term of this patent is extended or adjusted under 35 U.S.C. 154(b) by 0 days.

This patent is subject to a terminal disclaimer.

(21) Appl. No.: 13/296,692

(22) Filed: Nov. 15, 2011

(65) Prior Publication Data

US 2012/0059077 A1 Mar. 8, 2012

Related U.S. Application Data

(60) Continuation-in-part of application No. 12/500,701, filed on Jul. 10, 2009, now Pat. No. 8,314,193, which is a continuation of application No. 11/932,053, filed on Oct. 31, 2007, now Pat. No. 7,601,788, which is a continuation of application No. 11/638,200, filed on Dec. 13, 2006, now Pat. No. 7,309,749, which is a division of application No. 11/043,595, filed on Jan. 26, 2005, now Pat. No. 7,179,873.

(60) Provisional application No. 61/420,460, filed on Dec. 7, 2010.

(51) Int. Cl.
*C08F 30/04* (2006.01)
*C08F 130/04* (2006.01)
*C08F 20/06* (2006.01)
*C08L 33/06* (2006.01)
*B60C 1/00* (2006.01)

(52) U.S. Cl.
USPC ........ 526/240; 526/241; 526/317.1; 524/560; 524/261

(58) Field of Classification Search
USPC ................ 526/240, 241, 317.1; 524/560, 261
See application file for complete search history.

(56) References Cited

U.S. PATENT DOCUMENTS 5,159,035 A * 10/1992 Evani ............................. 526/240
7,601,788 B2 10/2009 Reimers et al.

* cited by examiner

*Primary Examiner* — Michael M Bernshteyn

(57) ABSTRACT

Embodiments of the present invention include a branched aromatic ionomer, and a process of making it, by co-polymerizing a first monomer comprising an aromatic moiety and an unsaturated alkyl moiety and a second monomer represented by the general formula:

$$[R-A^Z]_y-M^X$$

wherein R is a hydrocarbon chain having from 2 to 40 carbons and at least one polymerizable unsaturation; A is an anionic group; M is a cationic group; Z is −1 or −2; X is +1, +2, +3, +4, or +5; and y is an integer having a value of from 1 to 4. The branched aromatic ionomer has a melt flow index ranging from 1.0 g/10 min. to 13 g/10 min. Optionally the melt flow index ranges from 1.3 g/10 min. to 1.9 g/10 min.

25 Claims, 3 Drawing Sheets

Hauloff force vs Hauloff speed

LOW MELT FLOW BRANCHED IONOMERS

CROSS-REFERENCE TO RELATED APPLICATIONS

This application is a non-provisional of U.S. Provisional Application Ser. No. 61/420,460 and this application is also a continuation-in-part of U.S. patent application Ser. No. 12/500,701, filed Jul. 10, 2009, which is a continuation of U.S. patent application Ser. No. 11/932,053, filed Oct. 31, 2007 (now U.S. Pat. No. 7,601,788), which is a continuation of U.S. patent application Ser. No. 11/638,200, filed Dec. 13, 2006 (now U.S. Pat. No. 7,309,749), which is a divisional of U.S. patent application Ser. No. 11/043,595, filed Jan. 26, 2005 (now U.S. Pat. No. 7,179,873).

FIELD

Embodiments of the present invention generally relate to branched ionomers having a low melt flow rate.

BACKGROUND

In the art of preparing polymers, it can be desirable to impart to or increase the branching of polymer chains. Increased branching may impart physical property changes to the polymer, such as increased strength, higher temperature performance, and improved hardness, for example. In some instances, increased branching may improve properties such as elastomeric performance and abrasion resistance.

Ionomers are known to be useful in many applications. For example, a polyester ionomer dyeability enhancer may be derived from the reaction residue of an aryl carboxylic acid sulfonate salt, an aromatic dicarboxylic acid, an aliphatic dicarboxylic acid, an aliphatic diol or any of their ester-forming derivatives. A photocurable dental cement may be prepared using a photocurable ionomer, which is defined as a polymer having sufficient pendent ionic groups to undergo a setting reaction in the presence of a reactive filler and water, and sufficient pendent polymerizable groups to enable the resulting mixture to be polymerized, e.g., cured upon exposure to radiant energy.

However, efforts continue to improve physical properties of polymers.

SUMMARY

Embodiments of the present invention include a branched aromatic ionomer that is the product of co-polymerizing a first monomer comprising an aromatic moiety and an unsaturated alkyl moiety and a second monomer represented by the general formula:

$$[R-A^Z]_y-M^X$$

wherein R is a hydrocarbon chain having from 2 to 40 carbons and at least one polymerizable unsaturation; A is an anionic group; M is a cationic group; Z is −1 or −2; X is +1, +2, +3, +4, or +5; and y is an integer having a value of from 1 to 4. The branched aromatic ionomer has a melt flow index ranging from 1.0 g/10 min. to 13 g/10 min. Optionally the melt flow index ranges from 1.3 g/10 min. to 1.9 g/10 min.

In an embodiment, either by itself or in combination with other embodiments, the first monomer can be selected from the group consisting of styrene, alphamethyl styrene, t-butyl-styrene, p-methylstyrene, vinyl toluene, and mixtures thereof.

In an embodiment, either by itself or in combination with other embodiments, the second monomer is selected from the group consisting of: zinc diacrylate, zinc dimethacrylate, zinc di-vinylacetate, zinc di-ethylfumarate: copper diacrylate, copper dimethacrylate, copper di-vinylacetate, copper di-ethylfumarate; aluminum (III) isopropoxide, aluminum triacrylate, aluminum trimethacrylate, aluminum tri-vinylacetate, aluminum tri-ethylfumarate; zirconium tetraacrylate, zirconium tetramethacrylate, zirconium tetra-vinylacetate, zirconium tetra-ethylfumarate, zirconium (IV) butoxide; and mixtures thereof.

In an embodiment, either by itself or in combination with other embodiments, the second monomer is present in amounts from 10 to 10,000 ppm, optionally from 100 to 2,500 ppm.

In an embodiment, either by itself or in combination with other embodiments, the ionomer exhibits a weight average molecular weight from 255,000 Dalton to 330,000 Dalton.

In an embodiment, either by itself or in combination with other embodiments, the ionomer exhibits a polydispersity from 1.8 to 3.1.

In an embodiment, either by itself or in combination with other embodiments, the ionomer exhibits a tensile strength at yield from 3,400 psi to 8,000 psi.

In an embodiment, either by itself or in combination with other embodiments, the ionomer exhibits a tensile strength at break from 3,200 psi to 7,900 psi.

In an embodiment, either by itself or in combination with other embodiments, the ionomer exhibits a flexural strength from 6,000 psi to 16,500 psi.

In an embodiment, either by itself or in combination with other embodiments, the ionomer exhibits a flexural modulus from 410,000 psi to 490,000 psi.

In an embodiment, either by itself or in combination with other embodiments, the invention includes a blown film formed by the ionomer.

In an embodiment, either by itself or in combination with other embodiments, the invention includes a foamed article formed by the ionomer.

Embodiments of the present invention include a process for preparing a branched aromatic ionomer that includes co-polymerizing a first monomer comprising an aromatic moiety and an unsaturated alkyl moiety and a second monomer represented by the general formula:

$$[R-A^Z]_y-M^X$$

wherein R is a hydrocarbon chain having from 2 to 40 carbons and at least one polymerizable unsaturation; A is an anionic group; M is a cationic group; Z is −1 or −2; X is +1, +2, +3, +4, or +5; and y is an integer having a value of from 1 to 4. The branched aromatic ionomer has a melt flow index from 1.0 g/10 min. to 13 g/10 min, optionally from 1.3 g/10 min. to 1.9 g/10 min.

In an embodiment, either by itself or in combination with other embodiments, the second monomer is prepared prior to the co-polymerization by admixing components in-line to a reactor or in-situ in a reactor.

In an embodiment, either by itself or in combination with other embodiments, the second monomer is prepared in-situ in the first monomer.

In an embodiment, either by itself or in combination with other embodiments, the second monomer is prepared from an unsaturated acid or anhydride and a metal alkoxide.

In an embodiment, either by itself or in combination with other embodiments, the second monomer is prepared by reacting an organic acid or an anhydride with a metal or metal salt.

In an embodiment, either by itself or in combination with other embodiments, the first monomer is selected from the group consisting of styrene, alphamethyl styrene, t-butylstyene, p-methylstyrene, vinyl toluene, and mixtures thereof.

In an embodiment, either by itself or in combination with other embodiments, the second monomer is selected from the group consisting of: zinc diacrylate, zinc dimethacrylate, zinc di-vinylacetate, zinc di-ethylfumarate: copper diacrylate, copper dimethacrylate, copper di-vinylacetate, copper di-ethylfumarate; aluminum (III) isopropoxide, aluminum triacrylate, aluminum trimethacrylate, aluminum tri-vinylacetate, aluminum tri-ethylfumarate; zirconium tetraacrylate, zirconium tetramethacrylate, zirconium tetra-vinylacetate, zirconium tetra-ethylfumarate, zirconium (IV) butoxide; and mixtures thereof.

In an embodiment, either by itself or in combination with other embodiments, the process includes the step of admixing the first and second monomers prior to or at the time of the co-polymerization.

In an embodiment, either by itself or in combination with other embodiments, the first and second monomers are admixed with a solvent prior to co-polymerization.

In an embodiment, either by itself or in combination with other embodiments, the process includes the steps of foaming the ionomer and using said foamed ionomer to make an article.

In an embodiment, either by itself or in combination with other embodiments, the process includes the step of making an article with said ionomer.

In an embodiment, either by itself or in combination with other embodiments, the ionomers are admixed with additives prior to being used in end use applications, and wherein the additives are selected from the group consisting of fire retardants, antioxidants, lubricants, blowing agents, UV stabilizers, antistatic agents, and combinations thereof.

DETAILED DESCRIPTION

Figure 1:
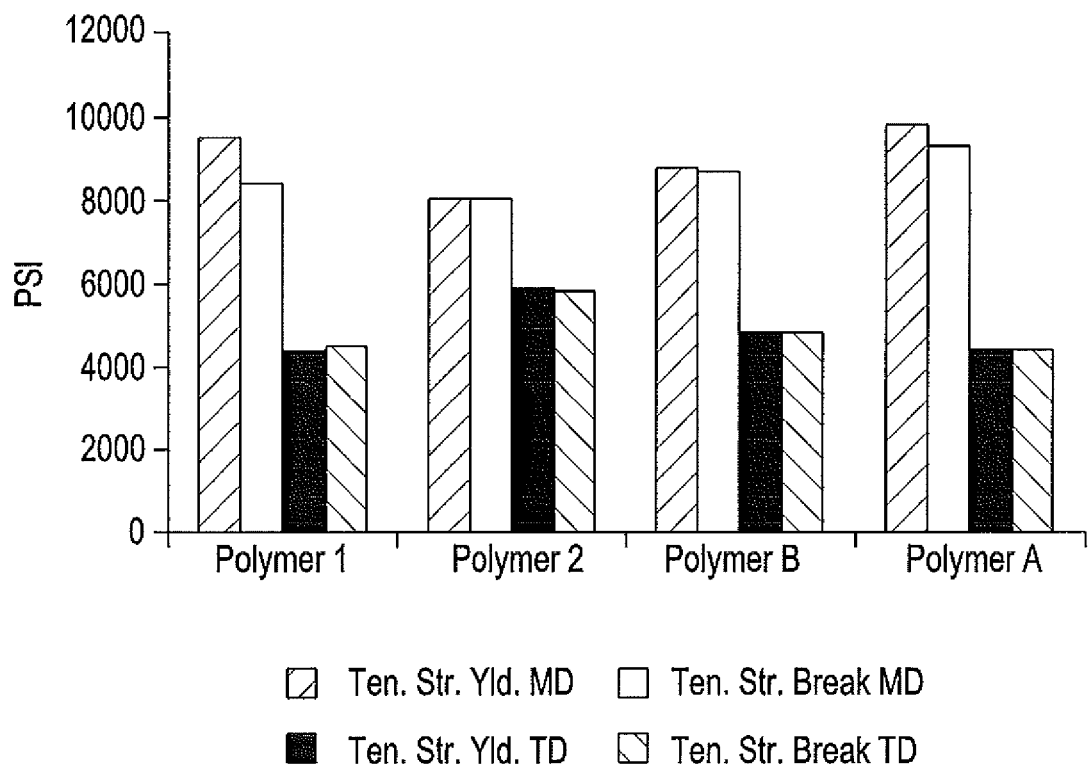
FIG. 1 illustrates blown film tensile properties of various neat polymer samples.

Branched aromatic ionomers may be formed by co-polymerizing a first monomer and a second monomer. The first monomer generally includes an aromatic moiety and an unsaturated alkyl moiety. For example, suitable monomers having an aromatic moiety and an unsaturated alkyl moiety may include monovinylaromatic compounds, such as styrene, as well as alkylated styrenes wherein the alkylated styrenes are alkylated in the nucleus or side-chain (e.g., alphamethyl styrene, t-butylstyrene, p-methylstyrene, and vinyl toluene) and combinations thereof.

The second monomer generally includes an ionic moiety and at least one unsaturated moiety. The ionic moiety generally includes at least two ionizable groups (one group that ionizes to form cations and one that ionizes to form anions). In one or more embodiments, the group that ionizes to form cations, hereinafter "cationic group," is a mono-valent group. In other embodiments, the cationic group is poly-valent and one capable of forming bridges to other molecules in the presence of ions of a suitable type and concentration. When the cationic group is a mono-valent group, it may be selected from mono-valent metals or a quaternary ammonium ion forming compounds, for example. Suitable metals include sodium, potassium, cesium, silver and combinations thereof, for example. Suitable quaternary ammonium compounds include ammonium chloride, methyl ammonium chloride, diethyl ammonium chloride and combinations thereof, for example. When the cationic group is one capable of forming bridges to other molecules in the presence of ions of a suitable type and concentration, it may be selected from groups that ionize to form cations having a valence of +2 or higher. In one or more embodiments, the cationic group may be selected from metals having an oxidation state of +2 or higher. Suitable metals include zinc, copper, lead, calcium, magnesium, zirconium, aluminum, and combinations thereof, for example.

The second ionizable group is generally an organic group that ionizes to form an anion having a coordination charge of −1 or lower. Suitable groups include anions of amines, carboxylic acids, sulfonic acids, phosphonic acids, thioglycolic acids and combinations thereof, for example. When the cationic group has a valence of greater than +1, the first and second ionizable groups may form a bridge.

Further, the anionic group generally includes at least one polymerizable unsaturated moiety. In some embodiments, there is only one polymerizable unsaturated moiety. In other embodiments, there may be two or more such moieties. The unsaturated moiety may be a terminal or non-terminal carbon-carbon double bond, for example.

Exemplary compounds useful as the second monomer may be prepared with a metal cation and an organic anion having at least one unsaturation. Suitable compounds that may be used as the second monomer include any having a general formula:

$$[R-A^Z]_y\text{-}M^X$$

wherein R is a hydrocarbon chain having from 2 to 40 carbons and at least one polymerizable unsaturation; A is an anionic group; M is a cationic group; Z is −1 or −2; X is +1, +2, +3, +4, or +5; and y is an integer having a value of from 1 to 4. When y is 1, R may have one or more polymerizable unsaturations. In embodiments where y is 1, R may have two or more unsaturations and the unsaturations will either be on separate chains or else sufficiently far apart on a single chain to allow for polymerization without substantial steric hindrance. In some embodiments, (y*Z)+X=0, that is, only anionic groups having a polymerizable unsaturation will be coordinated to the M group. However, if is within the scope of the claims that additional groups not having a polymerizable unsaturation may be coordinated to the M group, there may still be at least two polymerizable unsaturations coordinated to the M group in addition to any other coordinated groups.

Compounds that may be used as the second monomer include, but are not limited to, zinc diacrylate, zinc dimethacrylate, zinc di-vinylacetate, zinc di-ethylfumarate, and the like; copper diacrylate, copper dimethacrylate, copper di-vinylacetate, copper di-ethylfumarate, and the like; aluminum triacrylate, aluminum trimethacrylate, aluminum tri-vinylacetate, aluminum tri-ethylfumarate, and the like; zirconium tetraacrylate, zirconium tetramethacrylate, zirconium tetra-vinylacetate, zirconium tetra-ethylfumarate and combinations thereof, fore example. For compounds having monovalent cationic groups, the second monomer may be sodium acrylate, sodium methacrylate, silver methacrylate and combinations thereof, for example.

These compounds and any compound useful as the second monomer may be prepared by any method known to one skilled in the art. For example, the second monomer may be prepared by, for example, reacting an organic acid or an anhydride with a metal or metal salt. When the cation group is polyvalent, then the organic acid and the polyvalent metal may be reacted under conditions sufficient to prepare a bridge between the anionic group and the cationic group.

The monomers used to prepare the branched aromatic ionomers may interact in several ways to affect the physical properties of the ionomers. For example, the monomers may form covalent bonds due to the polymerization of the unsaturated moieties. Further, the monomers may interact to form a bridge, wherein a polyvalent cationic group is coordinated to two anionic groups which are integrated into the backbones of at least two separate chains, for example. This coordination may, in effect, crosslink the two chains thereby increasing that segment's total effective molecular weight to the sum of the two chains. In addition, the monomers may interact to form multiple bridges as described immediately above. The more crosslinking that occurs, the less flexible the three dimensional structure of the ionomer, which may result in lower melt flow values and increased melt strength.

Furthermore, when the cationic groups are mono-valent, the ionic moieties, while not fully bridged, may still associate due to hydrophobic-hydrophilic forces. In these embodiments, this weaker but still measurable force may result from the comparatively non-polar hydrophobic, non-ionic parts of the molecule being mutually attracted and repelled from the polar hydrophilic ionic parts of the ionomer. These forces are more noticeable as the proportion of the second monomer is increased in concentration.

Both the amount of second monomer and the type of interaction with the first monomer will dictate the amount of second monomer used. Therefore, in some embodiments where the interaction is weak, such as when the cationic group of the second monomer is mono-valent, and a significant amount of effect is desired from the second monomer, the branched ionomers are prepared with a comparatively large amount of the second monomer. For example, the ratio of first monomer to second monomer may be from about 999:1 to about 40:60, or from about 95:5 to about 50:50, or from about 90:10 to about 60:40 or from about 80:20 to about 70:30, for example.

Where the interaction is very strong, such as when the cationic group is di- or tri-valent, or only small changes to the properties of the ionomer due to the second monomer are desired, the amount of the second monomer is quite small. For example, the amount of the second monomer may be from 10 parts per million "ppm" to 10,000 ppm, optionally from 100 ppm to 5000 ppm, optionally from 250 ppm to 2500 ppm, optionally from 500 ppm to 1000 ppm for example.

The branched aromatic ionomer may be prepared by co-polymerizing the first and second monomers. The polymerization may be carried out using any method known to those of ordinary skill in the art of performing such polymerizations. (See, U.S. Pat. No. 5,540,813; U.S. Pat. No. 3,660,535 and U.S. Pat. No. 3,658,946, which are incorporated by reference herein.) For example, the polymerization may be carried out by using a polymerization initiator.

Examples of the polymerization initiators include radical polymerization initiators, such as benzoyl peroxide, lauroyl peroxide, t-butyl peroxybenzoate and 1,1-di-t-butylperoxy-2,4-di-t-butylcyclohexane and combinations thereof, for example. The amount of the polymerization initiator may be from about 0 to about 1 percent by weight of the monomers, or from about 0.01 to about 0.5 percent by weight of the monomers or from about 0.025 to about 0.05 percent by weight of the monomers, for example.

Alternatively, rather than using an initiator, the ionomer may be prepared using heat as an initiator. In yet another embodiment, the ionomer may be prepared using a non-conventional initiator, such as a metallocene catalyst as is disclosed in U.S. Pat. No. 6,706,827, which is incorporated by reference herein.

In one or more embodiments, the monomers may be admixed with a solvent and then polymerized. In other embodiments, one of the monomers may be dissolved in the other and then polymerized. In still other embodiments, the monomers may be fed concurrently and separately to a reactor, either neat or dissolved in a solvent, such as mineral oil. In yet another embodiment, the second monomer may be prepared in-situ or immediately prior to the polymerization by admixing the raw material components, such as an unsaturated acid or anhydride and a metal alkoxide, in-line or in the reactor.

In certain embodiments, the ionomers may be admixed with additives prior to being utilized in end use applications. Any additive known to be useful to those of ordinary skill in the art of preparing ionomers to be useful may be used with the branched ionomers. For example, the ionomers may be admixed with fire retardants, antioxidants, lubricants, blowing agents, UV stabilizers, antistatic agents and combinations thereof, for example.

The ionomers may exhibit a melt flow index (MFI) (as measured by ASTM D 1238 condition 200° C./5 kg) of from about 1 g/10 min. to about 40 g/10 min., or from about 1 g/10 min. to about 30 g/10 min., or from about 1 g/10 min. to about 10 g/10 min., or from about 1.3 g/10 min. to about 1.9 g/10 min. for example.

The ionomers may exhibit a weight average molecular weight $M_w$ (as measured by GPC) of from about 100,000 Dalton to about 340,000 Dalton, or from about 170,000 Dalton to about 340,000 Dalton or from about 255,000 Dalton to about 330,000 Dalton, for example.

The ionomers may exhibit a number average molecular weight $M_n$ (as measured by GPC) of from about 45,000 Dalton to about 140,000 Dalton, or from about 60,000 Dalton to about 140,000 Dalton or from about 90,000 Dalton to about 130,000 Dalton, for example.

The ionomers may exhibit a z average molecular weight $M_z$ (as measured by GPC) of from about 150,000 Dalton to about 630,000 Dalton, or from about 310,000 Dalton to about 630,000 Dalton or from about 400,000 Dalton to about 600,000 Dalton, for example.

The ionomers may exhibit a polydispersity (Mw/Mn) of from about 1.8 to about 3.1, or from about 2.0 to about 2.8 or from about 2.2 to about 2.8, for example.

The ionomers may exhibit a tensile strength at yield (as measured by ASTM D-638) of from about 3,400 psi to about 8,000 psi, or from about 5,800 psi to about 8,000 psi or from about 7,400 psi to about 7,900 psi, for example.

The ionomers may exhibit a tensile strength at break (as measured by ASTM D-638) of from about 3,200 psi to about 7,900 psi, or from about 5,600 psi to about 7,900 psi or from about 7,300 psi to about 7,800 psi, for example.

The ionomers may exhibit a tensile modulus (as measured by ASTM D-638) of from about 410,000 psi to about 490,000 psi, or from about 420,000 psi to about 490,000 psi or from about 425,000 psi to about 480,000 psi, for example.

The ionomers may exhibit a flexural strength (as measured by ASTM D-790) of from about 6,000 psi to about 16,500 psi, or from about 11,000 psi to about 16,500 psi or from about 14,000 psi to about 16,000 psi, for example.

The ionomers may exhibit a flexural modulus (as measured by ASTM D-790) of from about 410,000 psi to about 520,000 psi, or from about 430,000 psi to about 500,000 psi or from about 460,000 psi to about 490,000 psi, for example.

The ionomers are useful as general purpose polystyrene, but may also be used in other applications. For example, the ionomers may be foamed to prepare foamed polystyrene. The ionomers may be used in applications where high temperature performance is desirable such as microwave safe dishes and utensils. The ionomers may be used to form other objects such as containers and as components in automobiles, toys, and the like. The polar ionic moieties of the ionomers may enhance their compatibility with polyesters such as polyethylene terephthalate and polycarbonate, so the branched ionomers may be used in blends and alloys with these and other similarly polar polymers.

Of significant interest in foam applications is the reduction of foam weight. However, reduction of weight often leads to detrimental foam properties. However, embodiments of the invention are capable of forming foam products having reduced weight without a detrimental change in properties.

Accordingly, in one or more embodiments, the ionomers are utilized to form foamed polystyrene articles. Such foamed articles may include those known to one skilled in the art, such as insulation and/or packaging. The insulation materials may include foam board or sheet materials, for example. Molded polystyrene foams are widely used to insulate buildings and components of buildings. Foam sheets may alternatively be thermoformed into articles, such as trays or containers or may be molded into foamed dunnage shapes suitable for packaging applications, for example.

Alternatively, the ionomers may be utilized in film applications. Films include blown, oriented or cast films formed by extrusion or co-extrusion or by lamination useful as shrink film, cling film, stretch film, sealing films, oriented films, snack packaging, heavy duty bags, grocery sacks, baked and frozen food packaging, medical packaging, industrial liners, and membranes, for example, in food-contact and non-food contact application.

EXAMPLES

Experimental polymers which are embodiments of the present invention, referred to as Polymer A and Polymer B, were both produced in a pilot plant consisting of two CSTR prepolymerization reactors, four stirred horizontal plug flow reactors, an upflow preheater as a fifth reactor, followed by devolitization. Polymer A included styrene monomer, 400 ppm of L531 initiator (commercially available from Arkema) and 800 ppm of zinc dimethacrylate (Saret 634 available from Sartomer Company) as the second monomer and 900 ppm of zinc stearate. The second monomer was dissolved in the styrene monomer prior to entering the reactors. Polymer B included styrene monomer, 150 ppm of L531 initiator (commercially available from Arkema) and 850 ppm of zinc dimethacrylate (Saret 634 available from Sartomer Company) and 650 ppm of zinc stearate. The second monomer was dissolved in the styrene monomer prior to entering the reactors. In both cases the zinc stearate was added to the fourth plug flow reactor.

Polymer A was produced with a lower temperature profile to make a lower melt flow product as compared to Polymer B. The temperature profile of each run is shown in Table 1.

TABLE 1

|  | Polymer B | Polymer A |
|---|---|---|
| Reactor temps ° F. | 248/260/279/297/307/315/310 | 228/238/270/275/290/295/296 |
| MFI (g/10 min) | 3.0 | 1.6 |

Example 1

Various foam articles were formed and the resulting properties were analyzed. Inventive Polymer A and a comparison Polymer 1, which is commercially available from TOTAL PETROCHEMICALS USA, Inc. as 585T, were foamed into foam sheets and evaluated. The properties of the evaluated polymers are summarized in Table 2.

TABLE 2

| PROPERTY | ASTM | UNIT | COMPARATIVE POLYMER 1 | POLYMER A |
|---|---|---|---|---|
| Melt Flow (200° C.-5 kg) | D-1238 | g/10 min | 1.6 | 1.6 |
| Heat Distortion | D-648 | ° F. | 211 | 209 |
| Vicat Softening | D-1525 | ° F. | 225 | 223 |
| Tensile Strength | D-638 | PSI | 7,600 | 7,700 |
| Tensile Modulus | D-638 | PSI (E 5) | 4.3 | 4.6 |
| Flexural Strength | D-790 | PSI | 14,200 | 15,200 |
| Flexural Modulus | D-790 | PSI (E 5) | 4.3 | 4.8 |
| Density |  | g/cu cm | 1.04 | 1.04 |
| Linear Shrinkage | D-955 | in/in | .004-.007 | .004-.007 |
| Moisture |  | % | <0.1 | <0.1 |
| Melt Strength |  | N | 0.03 | 0.035 |
| Mw |  |  | 300,000 | 278,000 |
| Mn |  |  | 120,000 | 110,000 |
| MWD |  |  | 2.5 | 2.5 |

It was observed that that Polymer A ran well on the foam line with little process change as compared to the comparison Polymer 1. In addition, the Polymer A foamed sheet exhibited from 15-30% greater modulus and strength as compared to the comparison sheet. A polymer having increased modulus and strength may be used to make foam products having reduced weight without a detrimental change in properties. Polymer A is a low melt flow product that compares favorably with the commercially available comparative Polymer 1 and may be able to form end use articles having comparable physical properties while having reduced polymer usage and weight.

Example 2

Various blown film samples were formed and the resulting properties were analyzed. They were formed from inventive Polymer A; inventive Polymer B; comparison Polymer 1 which is commercially available as 585T from TOTAL PETROCHEMICALS USA, Inc. having a melt flow rate of 1.6 g/10 min. and comparison Polymer 2 which is commercially available as 535B from TOTAL PETROCHEMICALS USA, Inc. having a melt flow rate of 4.0 g/10 min. The polymer samples were formed at a blowup ratio of 2:1, a zone 1 temperature of 385° F., a zone 2 temperature of 410° F., a zone 3 temperature of 420° F. and an adaptor temperature of 400° F. Trial 1 formed blown film from neat polymer samples, while Trial 2 formed blown film from the polymer samples blended with K-Resin, commercially available from Chevron-Phillips, in a ratio of 75:25 (75% polymer:25% K-Resin).

The Instron tensile analysis and percent shrinkage data for each neat sample is illustrated in Table 3 below.

TABLE 3

|  | Units | Polymer 1 | Polymer 2 | Polymer B | Polymer A |
|---|---|---|---|---|---|
| Ten. Str. Yld. MD | PSI | 9459 | 7980 | 8701 | 9783 |
| Ten. Str. Break MD | PSI | 8354 | 7979 | 8629 | 9253 |
| Elongation MD | % | 4.7 | 3.8 | 4.0 | 4.6 |
| Ten. Str. Yld. TD | PSI | 4378 | 5840 | 4803 | 4402 |
| Ten. Str. Break TD | PSI | 4473 | 5825 | 4803 | 4392 |
| Elongation TD | % | 2.4 | 2.0 | 2.0 | 2.3 |
| Shrinkage MD | % | 75 | 78 | 67 | 75 |
| Shrinkage TD | % | 20 | 18 | 15 | 18 |

It was observed that Polymer A exhibited greater machine direction tensile strength (yield and maximum) than the comparative Polymer 1 while they had comparable melt flows. It was observed that Polymer B exhibited greater machine direction tensile strength (yield and maximum) than the comparative Polymer 2 while they had comparable melt flows. A polymer having increased tensile strength can be used to make film products having reduced weight without a detrimental change in properties.

Figure 3:
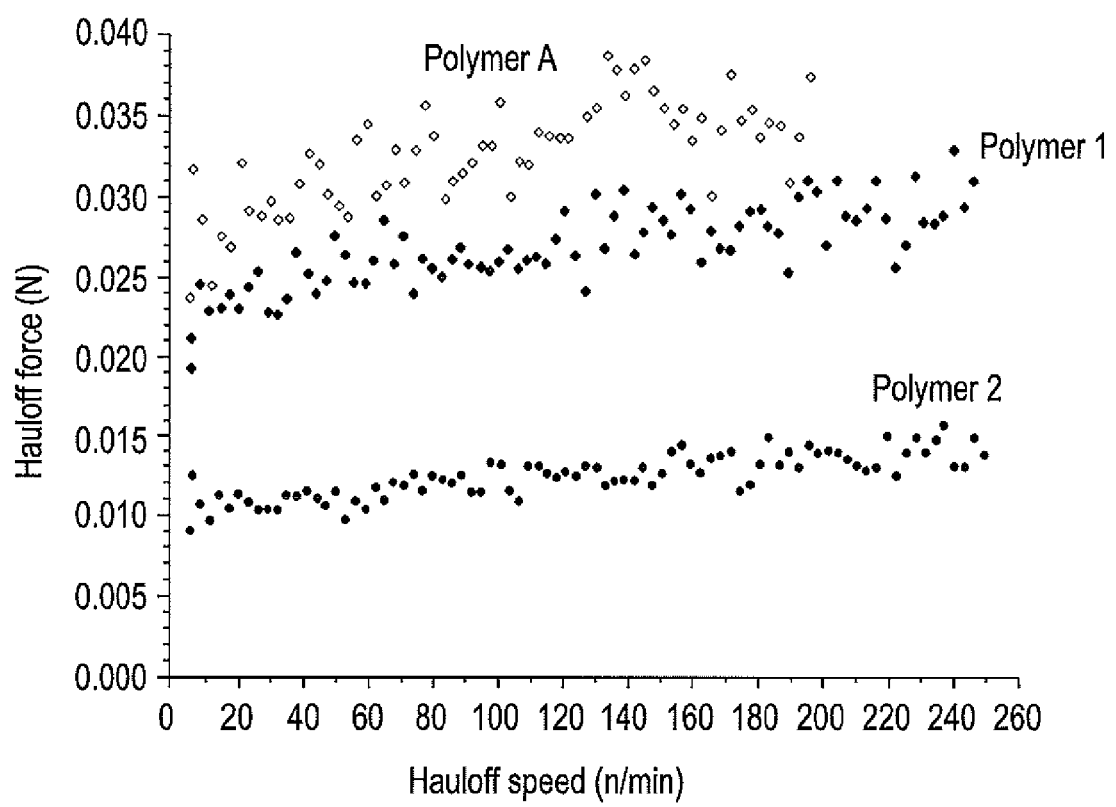
FIG. 3 illustrates hauloff force vs hauloff speed of various neat polymer samples.

The hauloff force for Polymer A and comparative Polymers 1 and 2 were tested and the results are shown in FIG. 3 as Hauloff force vs Hauloff speed, Inventive Polymer A exhibits greater Hauloff force than either comparative Polymer 1 or comparative Polymer 2, again illustrating improved properties versus a comparative polymer of the same melt flow. A polymer having increased Hauloff can be used to make film products having reduced weight without a detrimental change in properties.

The Instron tensile analysis and percent shrinkage data for each blended sample is illustrated in Table 4 below.

TABLE 4

|  | Units | Polymer 1 blend | Polymer 2 blend | Polymer B blend | Polymer A blend |
|---|---|---|---|---|---|
| Ten. Str. Yld. MD | PSI | 6642 | 6496 | 6452 | 7982 |
| Ten. Str. Break MD | PSI | 5538 | 6271 | 6277 | 6913 |
| Elongation MD | % | 3.4 | 3.7 | 3.5 | 4.1 |
| Ten. Str. Yld. TD | PSI | 5526 | 5344 | 4230 | 5088 |
| Ten. Str. Break TD | PSI | 5436 | 5300 | 4218 | 5006 |
| Elongation TD | % | 3.3 | 3.1 | 3.0 | 3.2 |
| Shrinkage MD | % | 70 | 55 | 78 | 62 |
| Shrinkage TD | % | 25 | 15 | 25 | 20 |

Figure 2:
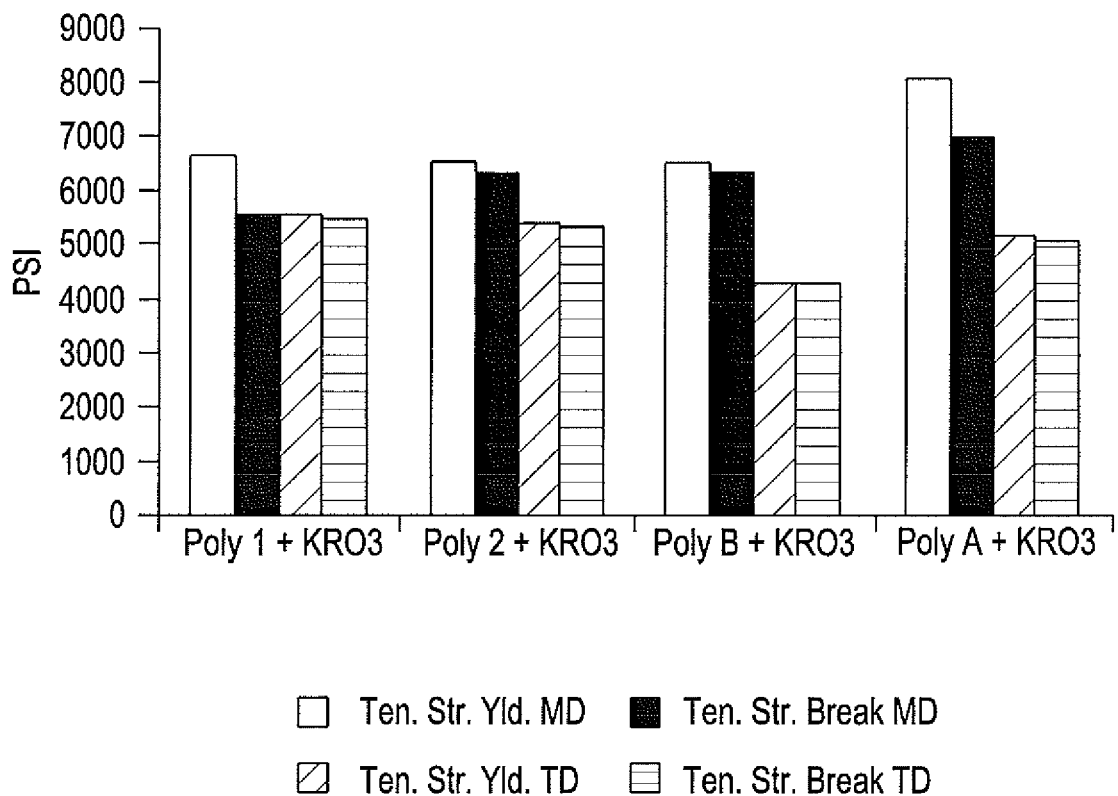
FIG. 2 illustrates blown film tensile properties of various blended polymer samples.

The blown film tensile properties are shown in FIGS. 1 and 2.

It was observed that Polymer A exhibited greater machine direction tensile strength (yield and maximum) than the other polymer samples. It appears that Polymer A further exhibited enhanced synergism when blended. At a 25% loading, a significant improvement was observed in machine direction tensile strength while the transverse direction properties are near or slightly below comparison polymers. A polymer having increased tensile strength can be used to make film products having reduced weight without a detrimental change in properties.

Each of the appended claims defines a separate invention, which for infringement purposes is recognized as including equivalents to the various elements or limitations specified in the claims. Depending on the context, all references below to the "invention" may in some cases refer to certain specific embodiments only. In other cases it will be recognized that references to the "invention" will refer to subject matter recited in one or more, but not necessarily all, of the claims. Each of the inventions will now be described in greater detail below, including specific embodiments, versions and examples, but the inventions are not limited to these embodiments, versions or examples, which are included to enable a person having ordinary skill in the art to make and use the inventions when the information in this patent is combined with available information and technology.

Various terms as used herein are shown below. To the extent a term used in a claim is not defined below, it should be given the broadest definition skilled persons in the pertinent art have given that term as reflected in printed publications and issued patents at the time of filing. Further, unless otherwise specified, all compounds described herein may be substituted or unsubstituted and the listing of compounds includes derivatives thereof.

Embodiments of the invention generally include forming branched aromatic ionomers. As used herein, the term "ionomer" is defined as a polymer with covalent bonds between elements of the polymer chain and ionic bonds between separate chains of the polymer (or as sometimes referred to, polymers containing inter-chain ionic bonding). The ionomers described herein uniquely contain reversible crosslinks. At melt processing temperatures, the reversible crosslinks generally disassociate to later reform as the material cools to its glass transition temperature.

Use of the term "optionally" with respect to any element of a claim is intended to mean that the subject element is required, or alternatively, is not required. Both alternatives are intended to be within the scope of the claim. Use of broader terms such as comprises, includes, having, etc. should be understood to provide support for narrower terms such as consisting of, consisting essentially of, comprised substantially of, etc.

The various embodiments of the present invention can be joined in combination with other inventions of the invention and the listed embodiments herein are not meant to limit the invention. All combinations of various inventions of the invention are enabled, even if not given in a particular example herein.

While illustrative embodiments have been depicted and described, modifications thereof can be made by one skilled in the art without departing from the spirit and scope of the disclosure. Where numerical ranges or limitations are expressly stated, such express ranges or limitations should be understood to include iterative ranges or limitations of like magnitude falling within the expressly stated ranges or limitations (e.g., from about 1 to about 10 includes, 2, 3, 4, etc.; greater than 0.10 includes 0.11, 0.12, 0.13, etc.).

Depending on the context, all references herein to the "invention" may in some cases refer to certain specific embodiments only. In other cases it may refer to subject matter recited in one or more, but not necessarily all, of the claims. While the foregoing is directed to embodiments, versions and examples of the present invention, which are included to enable a person of ordinary skill in the art to make and use the inventions when the information in this patent is combined with available information and technology, the inventions are not limited to only these particular embodiments, versions and examples. Also, it is within the scope of this disclosure that the embodiments disclosed herein are usable and combinable with every other embodiment disclosed herein, and consequently, this disclosure is enabling for any and all combinations of the embodiments disclosed herein. Other and further embodiments, versions and examples of the invention may be devised without departing from the basic scope thereof and the scope thereof is determined by the claims that follow.

What is claimed is:

1. A branched aromatic ionomer comprising a product of co-polymerizing a first monomer comprising an aromatic moiety and an unsaturated alkyl moiety and a second monomer
    wherein the second monomer is selected from a group consisting of zinc di-vinylacetate, zinc di-ethylfumarate: copper diacrylate, copper dimethacrylate, copper di-vinylacetate, copper di-ethylfumarate; aluminum (III) isopropoxide, aluminum triacrylate, aluminum trimethacrylate, aluminum tri-vinylacetate, aluminum tri-ethylfumarate; zirconium tetraacrylate, zirconium tetramethacrylate, zirconium tetra-vinylacetate, zirconium tetra-ethylfumarate, zirconium (IV) butoxide; and mixtures thereof.

2. The ionomer of claim 1, wherein the branched aromatic ionomer exhibits a melt flow index (as measured by ASTM D-1238) of from 1.0 g/10 min. to 13 g/10 min.

3. The ionomer of claim 1, wherein the first monomer is selected from the group consisting of styrene, alphamethyl styrene, t-butylstyrene, p-methylstyrene, vinyl toluene, and mixtures thereof.

4. The ionomer of claim 1, wherein the second monomer is present in amounts of from 10 to 10,000 ppm.

5. The ionomer of claim 1, wherein the second monomer is present in amounts of from 100 to 2,500 ppm.

6. The ionomer of claim 1, wherein the ionomer exhibits a weight average molecular weight of from 255,000 Dalton to 330,000 Dalton.

7. The ionomer of claim 1, wherein the ionomer exhibits a polydispersity of from 1.8 to 3.1.

8. The ionomer of claim 1, wherein the ionomer exhibits a tensile strength at yield (as measured by ASTM D-638) of from 3,400 psi to 8,000 psi.

9. The ionomer of claim 1, wherein the ionomer exhibits a tensile strength at break (as measured by ASTM D-638) of from 3,200 psi to 7,900 psi.

10. The ionomer of claim 1, wherein the ionomer exhibits a flexural strength (as measured by ASTM D-790) of from 6,000 psi to 16,500 psi.

11. The ionomer of claim 1, wherein the ionomer exhibits a flexural modulus (as measured by ASTM D-790) of from 410,000 psi to 490,000 psi.

12. A blown film formed by the ionomer of claim 1.

13. A foamed article formed by the ionomer of claim 1.

14. A process for preparing a branched aromatic ionomer comprising: co-polymerizing a first monomer comprising an aromatic moiety and an unsaturated alkyl moiety and a second monomer
    wherein the second monomer is selected from a group consisting of zinc di-vinylacetate, zinc di-ethylfumarate: copper diacrylate, copper dimethacrylate, copper di-vinylacetate, copper di-ethylfumarate; aluminum (III) isopropoxide, aluminum triacrylate, aluminum trimethacrylate, aluminum tri-vinylacetate, aluminum tri-ethylfumarate; zirconium tetraacrylate, zirconium tetramethacrylate, zirconium tetra-vinylacetate, zirconium tetra-ethylfumarate, zirconium (IV) butoxide; and mixtures thereof.

15. The process of claim 14, wherein the branched aromatic ionomer exhibits a melt flow index (as measured by ASTM D-1238) of from 1.0 g/10 min. to 13 g/10 min.

16. The process of claim 14, wherein the second monomer is prepared prior to the co-polymerization by admixing components in-line to a reactor or in-situ in a reactor.

17. The process of claim 14, wherein the second monomer is prepared in-situ in the first monomer.

18. The process of claim 14, wherein the second monomer is prepared from an unsaturated acid or anhydride and a metal alkoxide.

19. The process of claim 14, wherein the second monomer is prepared by reacting an organic acid or an anhydride with a metal or metal salt.

20. The process of claim 14, wherein the first monomer is selected from the group consisting of styrene, alphamethyl styrene, t-butylstyene, p-methylstyrene, vinyl toluene, and mixtures thereof.

21. The process of claim 14, further comprising the step of admixing the first and second monomers prior to or at the time of the co-polymerization.

22. The process of claim 14, wherein the first and second monomers are admixed with a solvent prior to co-polymerization.

23. The process of claim 14, further comprising the steps of foaming the ionomer and using said foamed ionomer to make an article.

24. The process of claim 14, further comprising the step of making an article with said ionomer.

25. The process of claim 14, wherein the ionomers are admixed with additives prior to being used in end use applications, and wherein the additives are selected from the group consisting of fire retardants, antioxidants, lubricants, blowing agents, UV stabilizers, antistatic agents, and combinations thereof.

* * * * *